April 25, 1967     R. P. FLANNAGAN     3,315,997
PLATE SNIPE MEANS AND METHOD OF MAKING SAME
Filed March 31, 1965
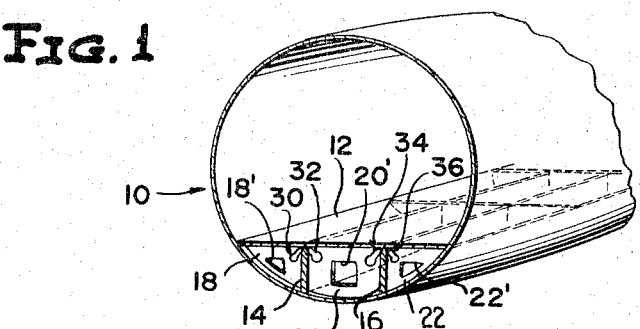
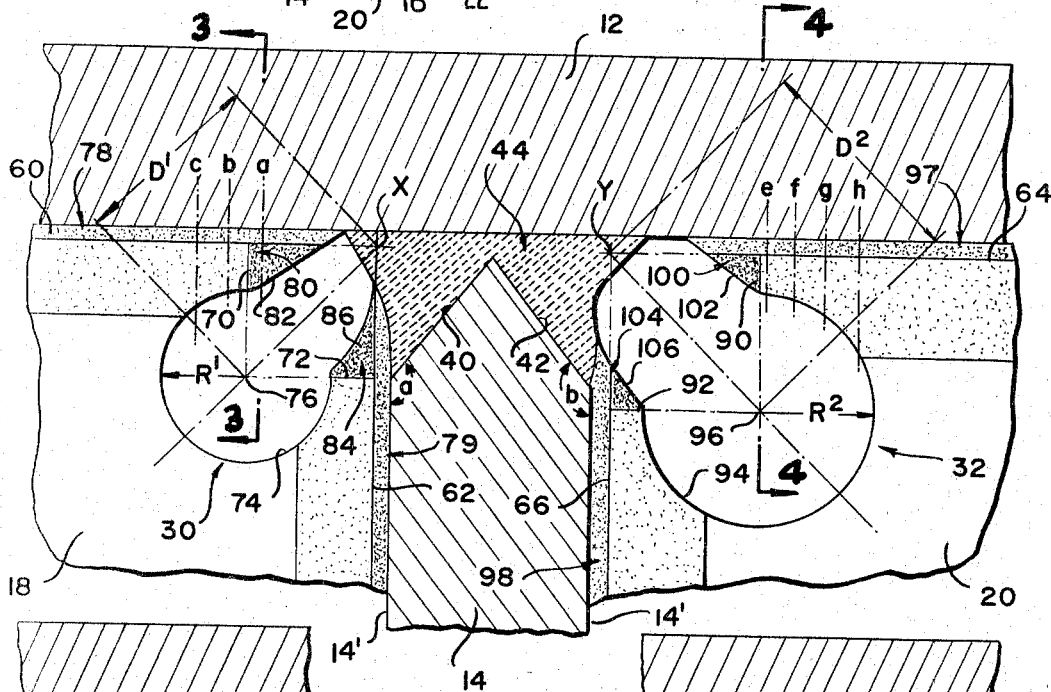
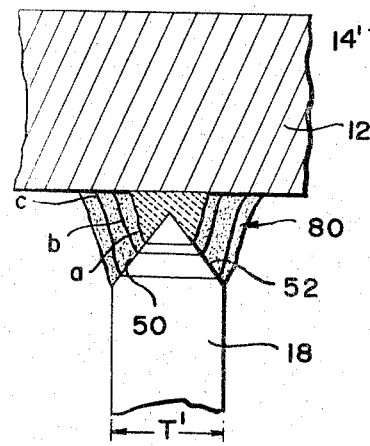
INVENTOR
RICHARD P. FLANNAGAN
BY *Shoemaker and Mattare*
ATTORNEYS

United States Patent Office 3,315,997
Patented Apr. 25, 1967

3,315,997
PLATE SNIPE MEANS AND METHOD OF
MAKING SAME
Richard P. Flannagan, Newport News, Va., assignor to
Newport News Shipbuilding and Dry Dock Company,
Newport News, Va., a corporation of Virginia
Filed Mar. 31, 1965, Ser. No. 444,329
14 Claims. (Cl. 287—189.36)

The present invention relates to new and novel plate snipe means and method of making same, and more particularly to plate snipe means especially designed to reduce stress concentrations in relatively thick plate welded assemblies.

The present invention is concerned with snipe means provided in a corner area of a relatively thick rigid plate formed of steel or the like, and wherein a plurality of steel plates are to be welded to one another to provide a rigid structure.

In ships, it is necessary to provide certain portions of the ship which are subjected to great stress, and accordingly certain portions of the ship such as the tanks thereof must be very rigid, thereby necessitating the use of relatively thick plates.

The thick plates utilized in such structures are of high strength materials, and the strength of the plates must be maintained in the finished structure. At the same time, it is desirable to remove a corner portion of certain of the plates in order to facilitate the necessary welding of the plates and to provide a vent means for the finished tanks. Furthermore, this so-called snipe means provided in the corner of certain plates may be of a particular construction so as to eliminate stress concentrations adjacent the edges of the plates and in the weldments abutting the plates.

Snipe means have been provided in such plates in the prior art, but the construction thereof has been such that sharp corners and small radii were provided which resulted in concentrations of stress and eventual cracking of the welds.

In the present invention, the snipe means is of a unique construction and configuration so as to overcome the disadvantages present with the prior art arrangements. A corner of the plate is cutout in a particular manner, and the welds are made such that the desired end results are obtained. The cutout portion is of a unique configuration which is generally in the shape of a keyhole. The cutout is defined by a pair of inwardly extending edges which are disposed substantially normally to adjacent intersecting edges of the original plate, and the inner ends of these inwardly extending edges are joined by an elongated curved edge. This curved edge preferably forms a portion or arc of a circle, and in the preferred embodiment defines an arc of approximately 270 degrees. The radius of the circle is of a certain critical relationship with respect to the thickness of the plate, and the location of the center of the circle is also in a particular critical position relative to the original corner of the plate. When the cutout is formed within these certain critical limits, the desired end results are obtained. While the hereinafter mentioned proportions of the radius and position of the circle relative to the thickness of the plate may be varied to a certain extent, it should be understood that the proportions as set forth must be approximately on the same order in order to afford the intended effect.

In addition to providing the unique cutout arrangement, the welds formed along the adjacent intersecting edges of the plate are of a certain construction so as to eliminate sharp corners and small radii thereby substantially reducing any stress concentrations adjacent the weld and the corner of the plate. This of course results in a substantial improvement in performance of the over-all assembly since the amount of cracking encountered in the welds is very greatly reduced.

The cutout portion also provides very good access to the weld area at the corner of the plate, and furthermore will serve to provide a vent means for the completed tank structure.

The novel method of the present invention enables the plate snipe means to be made in a most simple and efficient manner and in a minimum amount of time. The novel method also contemplates a particular manner of making the over-all rigid plate assemblies including a plurality of plates which are welded to one another.

An object of the present invention is to provide new and novel plate snipe means which is especially adapted to be employed with relatively thick plates which are intended to be welded together to provide a rigid structure.

Another object of the invention is the provision of plate snipe means which will provide vent means from completed tanks made according to the present invention.

Still another object of the invention is to provide plate snipe means which provides ready access to the weld area adjacent the corner of the plate so that such area is visible and so that the necessary welding equipment can be readily manipulated.

Yet a further object of the invention is the provision of plate snipe means which eliminates stress concentrations in the weld portions and in the corner of the plate thereby substantially reducing cracking of the welds in use.

Still a further object of the invention is to provide plate snipe means which affords the foregoing advantages while at the same time retaining sufficient over-all strength of the plate so that the rigid structure can withstand the imposed loads.

A further object of the invention is the provision of a novel method of making plate snipe means and a completed plate assembly in a most simple and efficient manner and in a minimum amount of time.

Other objects and many attendant advantages of the invention will become more apparent when considered in connection with the specification and accompanying drawings, wherein:

FIG. 1 is a perspective view of a portion of a ship illustrating the manner in which the snipe means of the present invention may be employed;

FIG. 2 is an enlarged vertical section through a portion of a rigid plate assembly illustrating the snipe means of the present invention;

FIG. 3 is a sectional view taken substantially along line 3—3 of FIG. 2 looking in the direction of the arrows; and FIG. 4 is a sectional view taken substantially along line 4—4 of FIG. 3 looking in the direction of the arrows.

Referring now to the drawings wherein like reference characters designate corresponding parts throughout the several views, FIG. 1 illustrates a sectional view in perspective through a portion of a ship structure wherein the outer generally cylindrical shell is indicated by reference numeral 10. An overlying plate or deck 12 is suitably welded in place within the frame 10, and beneath this plate means are disposed a plurality of tanks which are defined between a rigid welded plate structure. This rigid welded plate structure includes substantially continuous longitudinally extending plate means or bulkheads 14 and 16 which extend in a direction substantially parallel with the longitudinal axis of the vessel. A plurality of tanks are defined between these longitudinally extending plate means and the adjacent outer shell of the vessel and the overlying plate or deck means 12 by a plurality of transversely extending plate means which may be spaced at suitable intervals longitudinally of the vessel. As seen in FIG. 1, three transversely extending plates 18, 20 and 22 are provided, and similar plates may be disposed at spaced intervals therefrom. It will be noted that plate 18 is disposed between the outer shell 10 and longitudinally extending plate 14, while plate 20 extends between plates 14 and 16, and plate 22 extends between plate 16 and the outer shell. These three transversely extending plates 18, 20 and 22 are provided with central cutout portions 18′, 20′ and 22′.

The various plates are also provided with suitable snipe means, plate 18 being provided with snipe means 30 as seen in FIG. 1, plate 20 being provided with snipe means 32 and 34 at the opposite upper corners thereof, and plate 22 being provided with snipe means 36 at the upper corner thereof adjacent plate 16.

Referring now particularly to FIG. 2, the details of construction and interconnection of plates 12, 14, 18 and 20 is most clearly seen. Plate 14 is provided with a beveled upper edge defined by sloping surfaces 40 and 42 which define included angles $a$ and $b$ with the associated sides 14′ of plate 14 of approximately 135 degrees. This beveled upper edge portion of plate 14 is rigidly secured to the undersurface of plate 12 by a weld portion indicated generally by reference numeral 44. It will be understood that the various plates are of relatively thick construction and are flat plates, being formed of a rigid material such as steel or the like. In a typical example, plate 12 may have a thickness of approximately one and three-eighths inches (1⅜″), while plate 14 may have a thickness of approximately one and one-half inches (1½″). Plates 18 and 20 may be of the same thickness, but for the purpose of illustration are assumed to be of different thickness, plate 18 having in this example a thickness of approximately seven-eighths (⅞) of an inch while plate 20 has a thickness of approximately one and one-eighth inches (1⅛″).

As will be most clearly understood from an inspection of FIGS. 3 and 4, the upper edge of plate 18 is beveled so as to comprise two sloping surfaces 50 and 52, and the upper edge portion of plate 20 is beveled so as to provide two sloping surfaces 54 and 56. The side edges of these plates which extend substantially perpendicular to the top edges are similarly beveled, and as seen in FIG. 2, the uppermost edge of plate 18 is indicated by reference numeral 60 while one side edge thereof is indicated by reference numeral 62, these side edges extending along lines which intersect at the point $x$. In a similar manner, reference character 64 indicates the uppermost edge of plate 20, and reference numeral 66 indicates one side edge of plate 66 which extends substantially perpendicular to the edge 64. Edges 64 and 66 extend along lines which intersect at a point $y$ to define the corner of plate 20.

The snipe means formed in the upper corner of plate 18 includes a cutout portion. This cutout portion is defined by a first pair of inwardly extending edges 70 and 72 which extend respectively perpendicular to the outermost edges 60 and 62 of the plate. The inner ends of edges 70 and 72 are joined by a curved edge 74. This curved edge may be of various shapes such as an ellipse or the like, but is preferably a circular arc. The center of this circle along which edge 74 extends, is indicated at point 76, it being noticed that edges 70 and 72 are approximately aligned with radii of such circle.

The location of this circular portion and the size thereof are related in a critical manner to the thickness of the plate. The radius $R^1$ should be approximately three quarters (¾) of the thickness of the plate, and in this example may comprise approximately five-eighths (⅝) of an inch. It will also be noted that the center 76 of the circle is positioned symmetrically with respect to edges 60 and 62, and is spaced a distance $D^1$ from the point $x$ of the intersection of lines extending along the outer edges 60 and 62. This distance $D^1$ should be approximately one and one-half (1½) times the thickness of the plate, and in this example may be approximately one and three-eighths inches (1⅜″).

With these particular relationships, the desired end results can be obtained without unnecessarily weakening the plate structure. In addition to the aforementioned proportions, the radius $R^1$ of the circle and the distance $D^1$ of the center of the circle from the corner of the plate should be no more than 10% of the smallest dimension of the plate measured along the flat opposite surfaces thereof, or in other words these distances should not be more than 10% of the width of the plate.

If the cutout portion formed in the corner of the plate is other than circular, it is important that the edge portion thereof be smooth and continuous with no sharp radii to thereby eliminate any stress concentrations.

It will be noted that the upper edge 60 of plate 18 is spaced slightly below the undersurface of plate 12, and this spacing when initially assembling the plates is normally called the root opening. The upper edge of plate 18 is rigidly secured to the undersurface of plate 12 by a weld portion 78 which extends between the undersurface of plate 12 and the upper beveled edge of the plate, this weld portion filling the root opening as well. A similar weld portion 79 secures the adjacent side edge of plate 18 to one side surface 14′ of the plate 14 and fills the root opening initially provided therebetween.

A weld portion 80 is disposed in abutting relationship to inwardly extending edge 70, this weld portion defining a surface 82 which fairs smoothly into the adjacent joining edge 74 so as to provide a rather gently curving surface which eliminates any sharp corners at which stress concentrations could occur. In other words, surface 82 is so designed as to more or less comprise a continuation of the adjacent curved surface 74 of the cutout formed in the plate.

A further weld portion 84 is disposed in abutting relationship to inwardly extending edge 72, weld portion 84 defining a surface 86 which also fairs into the adjacent portion of the edge 74 so as to eliminate any sharp corners. Here again, surface 86 comprises more or less a continuation of the adjacent curved edge portion 74 thereby eliminating stress concentrations.

Turning now to FIG. 3 of the drawings, the thickness of the plate is indicated by reference character $T^1$ which as stated previously may be approximately seven-eighths (⅞) of an inch in this example. Also as seen in FIG. 3, the shape of weld portion 80 may be more clearly understood. Lines $a$, $b$ and $c$ indicate the shape of the weld along the outer surface of the weld as taken along lines $a$, $b$ and $c$ respectively in FIG. 2. It will be apparent from an inspection of FIG. 3 that the opposite sides of weld 80 taper inwardly toward one another toward the point of intersection $x$ of the lines extending along outer edges 60 and 62 of the plate. Also as seen in FIG. 2, weld portion 80 further tapers along surface 82 toward point $x$.

It should be understood that weld portion 84 is tapered in a manner similar to weld portion 80 such that the opposite sides of weld portion 84 taper toward a smaller dimension in a direction toward point $x$ as well as tapering in another dimension along surface 86.

Referring now to the snipe means formed at the upper corner of plate 20, this plate is provided with a cutout portion including inwardly extending edges 90 and 92 which are disposed perpendicular to the outer edges 64 and 66 respectively of plate 20. The inner ends of the inwardly extending edges 90 and 92 are joined by an elongated smooth and continuous edge 94 which may be of any configuration, but which is preferably circular. The center of the circle along which edge 94 is positioned is indicated by reference numeral 96. Here again, it will be noted that the inwardly extending edges 90 and 92 are disposed along lines formed radially of the circle, and as in the previously described construction, this curved edge extends through a circular arc of approximately 270 degrees.

Here again, the radius $R^2$ should be approximately three quarters (¾) of the thickness of the plate 20, and in this example may be about seven-eighths (⅞) of an inch. The distance $D^2$ should again be approximately one and one-half (1½) times the thickness of the plate and may be in this example about one and five-eighths inches (1⅝″). Distance $D^2$ is of course the distance of the center 96 of the circle from the point $y$, and the center 96 is disposed symmetrically with respect to the outer edges 64 and 66 of plate 20.

It will be noted that edges 64 and 66 of plate 20 are spaced from plates 12 and 14 respectively to provide root openings. A weld portion 97 is provided between the upper edge of plate 20 and the undersurface of plate 12 and fills the associated root opening. Another weld portion 98 is provided between the adjacent side edge of plate 20 and the associated side surface of plate 14 and fills the interposed root opening.

A weld portion indicated generally by reference numeral 100 is disposed in abutting relationship to inwardly extending edge 90, and a surface 102 of this weld portion fairs into the adjacent portion of edge 94 so as to eliminate any sharp corners and stress concentrations. Here again, surface 102 serves more or less as a continuation of the adjacent part of edge 94.

Another weld portion indicated generally by reference numeral 104 is disposed in abutting relationship to inwardly extending edge 92, and surface 106 of weld portion 104 fairs smoothly into the adjacent portion of edge 94 so as to eliminate any sharp corners and stress concentrations. Here again surface 106 is more or less a continuation of the adjacent part of edge 94.

Turning now to particularly to FIG. 4, the configuration of weld portion 100 may be most clearly understood. A plurality of lines $e$, $f$, $g$ and $h$ indicate the shape of the outer surface of the weld as taken along lines $e$, $f$, $g$ and $h$ as indicated in FIG. 2. Here again, it will be noted that the opposite sides of weld 100 taper toward the corner point $y$ of plate 20. As noted in FIG. 2, the weld portion 100 also tapers in a direction toward point $y$ due to the slope of undersurface 102 of this weld portion.

It will be understood that weld portion 104 also tapers in a manner similar to weld portion 100 such that the opposite sides of weld portion 104 taper to a smaller dimension in a direction toward point $y$. Weld portion 104 also tapers in another dimension along surface 106 toward point $y$.

It will be noted that in the finished snipe means, the provision of sharp corners and small radii is eliminated at the corner of the plate and the adjacent weld portions thereby reducing stress concentrations and minimizing cracking of the adjacent weld portions. It will further be noted that the cutout portions of each of the plates as well as the finished snipe means has a generally keyhole-shaped configuration.

In carrying out the method of the present invention, the plate or deck means 12 may first be mounted in operative position as shown in FIG. 1. Plate 14 is then disposed in suitable relationship to plate 12 as seen in FIG. 2, whereupon plate 14 is welded along the upper edge thereof to the undersurface of plate 12 by the weld portion 44 as indicated in this figure, it being understood that the upper edge of plate 14 is firstly suitably beveled before welding.

Plates 18 and 20 are then successively prepared and welded in place, and accordingly, a description of the method of assembling one of these plates will suffice for both.

Let us for example consider plate 18 which is first prepared along the edges thereof so as to provide suitable bevels thereon as previously described. The generally keyhole-shaped cutout portion is then formed in a suitable manner. This may be done in one of several ways. For example, a suitable cutting means such as a torch or the like may be used for cutting into the finished shape. As an alternative and in a preferred method of forming the cutout portion, a circular hole having a radius $R_1$ is first drilled in the corner of the plate, this circular hole having its center at point 76. Suitable cuts are then made along lines 70 and 72 to remove the corner portion of the plate, which it will be understood originally has the outer edges thereof extending to point $x$.

The edges 70, 72 and 74 are then ground as necessary to make them smooth and continuous.

Plate 18 is then positioned such that the upper edge 60 thereof is spaced from the undersurface of plate 12 and the side edge 62 thereof is spaced from the adjacent facing surface of plate 14.

The upper edges and side edges of plate 18 are then welded in place as illustrated by providing the weld portions 78 and 79.

Weld portions 80 and 84 are then formed to complete the structure. In forming weld portions 80 and 84, care is taken to suitably taper these weld portions as aforedescribed.

It will be understood that plate 20 is prepared and welded in place in the same manner as plate 18.

It is apparent from the foregoing that there is provided according to the present invention new and novel plate snipe means and method of making same wherein the snipe means is particularly adapted for use with relatively thick plates to be welded together to provide a rigid structure. The completed structure provides a suitable vent means from the tanks which it is desired to construct, and the snipe means further provides access to the weld area adjacent the intersection of the various plates. The over-all arrangement is such that sharp corners and small radii are eliminated in the completed structure which substantially reduces stress concentrations and minimizes cracking of the weld portions. At the same time, the arrangement of the present invention ensures that adequate strength of the plate is maintained. This is due to the fact that the radius of the circular arc, as well as its position from the original corner of the plate and its relationship to the over-all dimensions of the plate are of such proportion as aforesaid to enable the desired shape to be obtained and at the same time to retain good over-all strength of the plate. The novel method of the present invention enables the completed construction to be made in a simple and effective manner and in a minimum amount of time.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Plate snipe means comprising a relatively thick flat plate having adjacent edges extending along lines which intersect one another to define a point, said plate having snipe means adjacent said point and comprising a cutout portion, said cutout portion including a pair of edges each of which extends inwardly from one of said edges formed on the plate and substantially perpendicular thereto, the innermost portions of said inwardly extending edges being joined by an edge defining a circular arc of approximately 270 degrees so as to reduce stress concentrations in the corner of the plate while retaining sufficient over-all strength of the plate.

2. Plate snipe means comprising a relatively thick flat plate having adjacent edges extending along lines which are in directions perpendicular to one another and which intersect at a point, said plate having snipe means adjacent said point and comprising a cutout portion, said cutout portion being defined by a first pair of inwardly extending edges, each of said inwardly extending edges being disposed substantially perpendicular to one of said edges of the plate, the innermost portions of said inwardly extending edges being interconnected by an edge defining a circular arc of approximately 270 degrees, the center of said circular arc substantially coinciding with intersecting lines passing through each of said inwardly extending edges.

3. Plate snipe means comprising a plate having a certain thickness and including adjacent outer edges extending along lines which intersect at a point, said plate having snipe means comprising a cutout portion adjacent said point, said cutout portion including an edge defining a circular arc of at least approximately 270 degrees, the circular arc having a radius which is approximately three quarters of the thickness of said plate.

4. Apparatus as defined in claim 3 wherein the center of said circular arc is positioned from said point of intersection approximately one and one-half times the thickness of said plate and said center being symmetrically positioned with respect to said outer edges of the plate.

5. Plate snipe means comprising a plate having a certain thickness and including adjacent outer edges which extend along lines which intersect one another to define a corner point, said plate having snipe means adjacent said corner point and comprising a cutout portion, said cutout portion being defined by a pair of inwardly extending edges each of which extends substantially perpendicular to one of said outer surfaces of the plate, the innermost portions of each of said inwardly extending edges being connected by a further edge which defines a portion of a circle, said circle having a radius which is approximately three quarters the thickness of said plate, the center of said circle being positioned approximately one and one-half times the thickness of said plate from said corner point and being located symmetrically with respect to the outer edges of the plate, said inwardly extending edges being aligned with radii of said circle.

6. Plate snipe means comprising a relatively thick plate having adjacent edges extending along lines which intersect to define a corner of the plate, said plate having snipe means formed in said corner of the plate and defining a cutout portion, said cutout portion being defined by a pair of inwardly extending edges each of which extends substantially perpendicular to one of the outer edges of the plate, the innermost ends of said inwardly extending edges being interconnected by an edge defining a circular arc of approximately 270 degrees so as to reduce stress concentrations in the corner of the plate while retaining sufficient over-all strength of the plate, and weld portions disposed adjacent each of said inwardly extending edges, the surfaces of said weld portions fairing into the adjacent surfaces of said edge defining a circular arc so as to eliminate sharp corners and stress concentrations.

7. Plate snipe means comprising a relatively thick flat plate having adjacent edges extending along lines which intersect at a point, said plate having snipe means adjacent said point, said snipe means including a cutout portion formed in the plate, said cutout portion being defined by a first pair of inwardly extending edges which extend substantially perpendicular to one of said adjacent edges of the plate, the innermost portions of said inwardly extending edges being joined by an edge defining a circular arc of approximately 270 degrees, said inwardly extending edges lying along lines extending radially of said circle, a weld portion in abutment with each of said inwardly extending edges, each of said weld portions fairing into said edge defining said circular arc so as to eliminate sharp corners and stress concentrations, each of said weld portions tapering to a smaller dimension in a direction extending from the associated inwardly extending edge toward said point of intersection.

8. Apparatus as defined in claim 7 wherein said plate has a certain thickness, the circle of which said edge portion defines a circular arc having a radius of about three quarters the thickness of said plate, the center of said circle being disposed inwardly from said point of intersection a distance of about 1.5 times the thickness of said plate, the center of said circle being symmetrically located with respect to said adjacent edges of the plate.

9. A plate assembly including a first relatively thick flat plate, an overlying flat plate, said plates lying in planes which are perpendicular to one another, a relatively thick flat third plate disposed in a plane extending substantially perpendicular to each of said first-mentioned planes, said third plate including a first edge disposed adjacent said first-mentioned plate and a second edge dispose adjacent said second-mentioned plate, each of said edges being welded to the adjacent plate, said third plate having snipe means formed at the corner of the plate and adjacent said other two plates, said snipe means including a cutout portion of generally keyhole-shaped configuration.

10. Apparatus as defined in claim 9 wherein said cutout portion is defined by a first pair of inwardly extending edges each of which extends substantially perpendicular to one of said first-mentioned edges of the third plate, the inner ends of said inwardly extending edges being connected by an arcuate edge defining a circular arc of approximately 270 degrees, and a weld portion abutting each of said inwardly extending edges, each of said weld portions fairing into said arcuate edge so as to eliminate sharp corners and stress concentrations.

11. Apparatus as defined in claim 10 wherein said third plate has a certain thickness, said arcuate edge being formed along a portion of a particular circle, said circle having a radius approximately three quarters of the thickness of said third plate, the center of said circle being symmetrically located with respect to the first-mentioned edges of the plate, said first-mentioned edges of the plate extending along lines which intersect at a point, the center of said circle being spaced inwardly from said point a distance approximately one and one-half times the thickness of said third plate.

12. The method of making plate snipe means comprising providing a plate having adjacent intersecting edges defining a corner, providing a cutout portion in said corner by drilling a generally circular hole in the corner of the plate, said hole having a radius approximately three quarters of the thickness of the plate, the center of said hole being located symmetrically with respect to said adjacent intersecting edges of the plate and being positioned from the point of intersection of said edges a distance approximately one and one-half times the thickness of said plate, and then cutting inwardly from each of said adjacent intersecting edges until said hole is intersected to thereby remove a corner portion of the plate to complete the cutout portion at the corner of the plate.

13. The method as defined in claim 12 including the additional step of forming weld portions in abutment with the surfaces defined by each of said cuts extending inwardly from said adjacent intersecting edges of the plate, said weld portions defining surfaces fairing into the surfaces defined by said hole so as to eliminate any sharp corners and concentrations of stress.

14. The method of making a plate assembly comprising providing a first plate and a second plate, beveling one edge of said first plate, disposing said beveled edge adjacent said second plate, welding the beveled edge of said first plate to said second plate, providing a third plate having first and second outer adjacent intersecting edges defining a corner, beveling each of said last-mentioned edges, forming a cutout in the corners of said third plate by forming a generally circular hole in said third plate and forming a pair of cuts in said third plate, each of said cuts extending inwardly from one of said outer edges of the third plate and intersecting with said hole to remove a corner portion of the third plate, said third plate having a given thickness, said circular hole having a radius of about three quarters the thickness of said third plate, the center of said circular hole being positioned substantially symmetrical with respect to said outer edges of the third plate and being positioned from the point of intersection of said outer edges a distance of approximately one and one-half times the thickness of said third plate, positioning said third plate so that it is substantially perpendicular to said first and second plates with the first outer edge of said third plate spaced from said first plate and with the second outer edge of said third plate spaced from said second plate, welding said first outer edge of said third plate to said first plate, welding the second outer edge of said third plate to said second plate, then forming a weld adjacent each point of intersection of one of said cuts with said circular hole, each of said last-mentioned welds defining a surface which fairs into the adjacent surface of the hole so as to eliminate any sharp corners and stress concentrations.

References Cited by the Examiner

UNITED STATES PATENTS 2,426,802   9/1947   Wachsmann _____ 52—586 X

DAVID J. WILLIAMOWSKY, *Primary Examiner.*

HARRISON R. MOSELEY, *Examiner.*

P. M. CAUN, *Assistant Examiner.*